United States Patent [19]

Bonny

[11] Patent Number: 4,511,454
[45] Date of Patent: Apr. 16, 1985

[54] PROCESS FOR USE OF NOVEL BORIDE CATALYST

[75] Inventor: Alan Bonny, Shaker Heights, Ohio

[73] Assignee: The Standard Oil Company, Cleveland, Ohio

[21] Appl. No.: 550,775

[22] Filed: Nov. 14, 1983

Related U.S. Application Data

[62] Division of Ser. No. 408,859, Aug. 17, 1982, Pat. No. 4,439,542.

[51] Int. Cl.$^3$ .................... C10G 1/06; C10G 47/02
[52] U.S. Cl. ..................................... 208/10; 208/108; 208/112
[58] Field of Search .................... 208/10, 112, 108

[56] References Cited

U.S. PATENT DOCUMENTS

| | | | |
|---|---|---|---|
| 2,840,551 | 6/1958 | Field et al. | 260/93.7 |
| 2,892,826 | 6/1959 | Peters et al. | 260/93.7 |
| 2,898,326 | 8/1959 | Peters et al. | 260/88.1 |
| 2,980,604 | 4/1961 | Adams et al. | 208/112 X |
| 3,046,317 | 7/1962 | Myers | 208/112 X |
| 3,236,911 | 2/1966 | Shaw et al. | 260/683.15 |
| 3,475,325 | 10/1969 | Doane | 208/112 X |
| 3,536,632 | 10/1970 | Kroll | 252/430 |
| 3,796,671 | 3/1974 | Gleim | 252/432 |
| 3,836,452 | 9/1974 | Gleim | 208/108 |
| 3,862,025 | 1/1975 | Steele et al. | 208/112 X |
| 3,869,521 | 3/1975 | Benson | 260/667 |
| 3,993,557 | 11/1976 | Pine | 208/112 X |
| 4,192,770 | 3/1980 | Singleton | 252/414 |

OTHER PUBLICATIONS

M. F. Hawthorne, in E. L. Muetterties (Ed.) The Chemistry of Boron and its Compounds, John Wiley & Sons, N.Y., 1967, pp. 223-324.

Advanced Inorganic Chemistry, A Comprehensive Text, F. A. Cotton and G. Wilkinson, John Wiley & Sons, N.Y., 1980, (4th ed.), pp. 313-318.

Inorganic Chemistry, Principles of Structure and Reactivity, J. E. Huheey, Harper & Row, (2nd ed.), 1978, p. 623.

*Catalysis Reviews-Science and Engineering*, "Catalytically Active Borohydride-Reduced Nickel and Cobalt Systems", by Wade et al., (14(2), 211-246, (1976)).

*Primary Examiner*—William G. Wright
*Attorney, Agent, or Firm*—Salvatore P. Pace; David J. Untener; Larry W. Evans

[57] ABSTRACT

Novel heterogeneous boride catalysts comprising a polyborane anion and a Group VIII metal for the treatment of carbonaceous materials. The catalyst is prepared by the steps of contacting a polyborane anion with a salt of a Group VIII metal in the presence of a solvent to form a catalyst precursor, removing the solvent and, heating the precursor under hydrogen at a pressure of at least about 3.45 MPa at a temperature of from about 200° C. to about 600° C. Treatment of carbonaceous materials includes the steps of contacting the carbonaceous material with the heterogeneous boride catalyst and with hydrogen in the presence of a solvent in a reactor, pressurizing the reactor with hydrogen to at least about 3.45 MPa and, heating the reactor to a temperature of from about 200° C. to about 600° C. The heterogeneous boride catalyst can also be prepared in situ.

27 Claims, No Drawings

PROCESS FOR USE OF NOVEL BORIDE CATALYST

This is a division of application Ser. No. 408,859, filed Aug. 17, 1982 now U.S. Pat. No. 4,439,542.

TECHNICAL FIELD

The present invention is directed toward novel heterogeneous catalysts that can be utilized for the hydrodesulfurization of carbonaceous materials including middle distillates and bottoms of crude oil, shale oil and the hydroliquefication of coal. In the presence of these catalysts and hydrogen, sulfur and other heteroatoms including nitrogen and oxygen can be cleaved from polyaromatic ring containing compounds without total loss of aromaticity. Heteroatom containing compounds constitute the most significant problem in upgrading shale oil. Analysis has revealed that molecules containing sulfur, oxygen and/or nitrogen account for more than 60 weight percent of raw shale oil. Such molecules are undesirable in the products inasmuch as they cause gum formation, pollutant emissions and obnoxious odors.

Severe processing problems exist with heteroatoms in shale oil. They must be removed initially because they quickly deactivate the catalysts used to convert shale oil into refined products. The present invention also provides a novel process for the cleavage of heteroatoms, utilizing these catalysts, as well as a process for preparation of the catalyst.

BACKGROUND ART

The novel catalysts of the present invention comprise metal borides. The use of various boron containing catalysts for the treatment of oils and various aromatic compounds is generally known. U.S. Pat. No. 3,869,521 discloses a process for hydrogenation of aromatics to their corresponding aliphatic structure. The catalyst employed comprises a supported transition metal which has been contacted with a sodium borohydride solution.

U.S. Pat. Nos. 3,836,452 and 3,796,671 are directed to a process and catalyst, respectively, for the conversion of sulfurous, asphaltene-containing hydrocarbonaceous compounds. The catalyst comprises a boride or borohydride of a metal from Groups IV-B, V-B and VI-B combined with a porous carrier. The process involves heating a mixture of the charge stock and hydrogen in the presence of the catalyst and recovering desulfurized lower boiling hydrocarbons. As an example, a heavy, vacuum tower bottoms black oil, having a gravity of 7.0° API and contaminated by 6000 ppm of nitrogen, 4.0 weight percent sulfur and about 24.0 weight percent of pentane-insoluble asphaltenic materials was treated and converted to a liquid hydrocarbon product having a gravity of 33.8° API, 0.2 weight percent of insoluble asphaltics, 450 ppm of nitrogen and 0.88 weight percent of sulfur.

U.S. Pat. No. 3,536,632 discloses a process for the preparation of a catalyst that is particularly suited for hydrogenation but which is alleged to be useful in many other reactions such as dehydrogenation, desulfurization, aromatization, dimerization and ammonia synthesis. The catalyst comprises transition metals from Groups IV-B thru VII-B and Group VIII, with iron, cobalt, nickel and platinum from the latter group being preferred, which are activated by an organometallic reducing agent. The reducing agent is described by the formula $MR_n$ where R is aromatic or aliphatic and contains up to about 20 carbon atoms, M is a metal such as lithium, magnesium, calcium, strontium, zinc, cadmium, boron or aluminum and n is an integer from 1 to 3.

In addition to the work reported in these patents, others have prepared and described compounds containing nickel or cobalt with boron in a wide range of stoichiometries. They are known to be as good as or better than Raney nickel for hydrogenation reactions in terms of activity and fatigue resistance. Depending on the method of preparation, these metal borides may or may not be ferromagnetic and pyrophoric in air. There also exist methods for the removal of heteroatoms from oil and other organic liquids but catalysts employed in these processes often effect loss of unsaturation. This can be attributed to non-selective hydrogenation which results in a greater amount of costly hydrogen being used. Thus, none of the art of which I am aware has provided a catalyst and related process for treating carbonaceous liquids such as crude oil or shale oil which removes heteroatoms relatively easily, where the catalyst is not readily deactivated by sulfur and where unsaturation is not lost and which can also be used to treat carbonaceous solids such as coal to produce liquids.

DISCLOSURE OF THE INVENTION

It is therefore an object of the present invention to provide a novel heterogeneous boride catalyst for the removal of heteroatoms such as sulfur, nitrogen and oxygen, from carbonaceous materials such as crude oil, shale oil and to treat carbonaceous solids such as coal to produce liquids.

It is a further object of the present invention to provide a novel heterogenous boride catalyst which is not pyrophoric in air and which has a higher sulfur tolerance than Raney nickel.

It is further still an object to provide a novel heterogeneous boride catalyst which does not promote saturation of carbonaceous materials being treated to that extent that conventional catalysts such as Raney nickel are known to do.

It is another object of the present invention to provide a process for the preparation of heterogeneous boride catalysts by reacting polyborane anions with certain metal salts.

It is another object of the present invention to utilize high temperatures and high pressures of hydrogen to form novel boride catalysts which are insoluble in tetrahydrofuran and other ethers.

It is yet another object of the present invention to provide a novel process for the use of the catalysts herein which provides different product selectivities as compared with conventional oxide catalysts employed for heteroatom removal, e.g. extensive aromatic hydrogenation is not promoted.

It is another object of the present invention to provide a novel process for the use of the catalysts herein for the liquefaction of carbonaceous solids such as coal and for the cleavage of heteroatoms from carbonaceous liquids such as shale oil and crude oil.

It is still another object of the present invention to provide a catalyst and process having greater reactivity in reactions which remove heteroatoms than conventional catalysts.

These and other objects, together with the advantages thereof over the prior art, which shall become apparent from the specification which follows, are accomplished by the inventions as hereinafter described and claimed.

In general, the novel heterogeneous boride catalyst of the present invention comprises a polyborane anion and a Group VIII metal. The catalyst is prepared according to the process of the present invention by the steps of contacting a polyborane anion with a salt of a Group VIII metal in the presence of a solvent to form a catalyst precursor, removing the solvent and, heating the precursor under hydrogen at a pressure of at least about 3.45 MPa at a temperature of from about 200° C. to about 600° C. In a separate step, the polyborane anion can be prepared by contacting a polyborane material with a compound selected from the group consisting of Group IA and IIA metal hydrides in the presence of a solvent. Tetraalkyl ammonium salts of these anions, having from about one to four carbon atoms, may also be used.

The process for treating carbonaceous materials according to the present invention comprises the steps of contacting a carbonaceous material with a heterogeneous boride catalyst and with hydrogen in the presence of a solvent in a reactor, pressurizing the reactor with hydrogen to at least about 3.45 MPa and, heating the reactor to a temperature of from about 200° C. to about 600° C.

An additional process is also provided for treating carbonaceous materials which includes the steps of contacting a polyborane anion with a salt of a Group VIII metal in the presence of a solvent to form a catalyst precursor, removing the solvent, contacting a carbonaceous material with the catalyst precursor and with hydrogen in the presence of a solvent in a reactor, pressurizing the reactor with hydrogen to at least about 3.45 MPa and, heating the reactor to a temperature of from about 200° C. to about 600° C. for a period of time sufficient to form a heterogeneous boride catalyst and to treat the carbonaceous material therewith. This process provides an in situ preparation of the catalyst and is otherwise similar to the process of the present invention for the treatment of carbonaceous materials.

As will be discussed in greater detail hereinbelow, the heterogeneous boride catalyst of the present invention and the processes for the use thereof are particularly suitable for the liquefaction of ground coal or solvent refined coal or other similar carbonaceous solids. The catalyst and processes are also suitable for the removal of heteroatoms from shale oil and crude oil in such a manner that unsaturation is not totally lost, thus effecting a savings in hydrogen usage.

PREFERRED MODE FOR CARRYING OUT THE INVENTION

The catalysts of the present invention are derived from polyborane anions and Group VIII metals. Penta- and decaborane anions, $B_5H_8^-$ and $B_{10}H_{13}^-$ respectively, are preferred, although many other polyborane anions are known having from two to about 20 boron atoms and these should be operative based upon the results with the penta- and deca-species reported herein. Polyborane anions are derived from about twenty or more known neutral molecular boranes which include $B_2H_6$, $B_4H_{10}$, $B_5H_9$, $B_5H_{11}$, $B_6H_{10}$, $B_6H_{12}$, $B_8H_{12}$, $B_8H_{14}$, $B_8H_{16}$, $B_8H_{18}$, $B_9H_{15}$, $i-B_9H_{15}$, $B_{10}H_{14}$, $B_{10}H_{16}$, $\alpha-B_{10}H_{18}$, $\beta-B_{10}H_{18}$, $B_{10}H_{20}$, $B_{16}H_{20}$, $B_{18}H_{22}$, $i-B_{18}H_{22}$, and $B_{20}H_{16}$. The anions are themselves derived chemically from these polyboranes typically by deprotonation or addition of a hydride ion. Members of this class would include $B_2H_7^-$, $B_3H_8^-$, $B_4H_7^-$, $B_5H_8^-$, $B_5H_{10}^-$, $B_6H_9^-$, $B_9H_{12}^-$, $B_9H_{14}^-$, $B_{10}H_{13}^-$, $B_{10}H_{12}^{2-}$, $B_{10}H_{14}^{2-}$, $B_{10}H_{15}^-$, $B_{11}H_{14}^-$ and $B_{11}H_{13}^{2-}$ and others. Additionally, anions derived from linked boron hydride units, including $B_{18}H_{21}^-$, $B_{20}H_{18}^{2-}$ (two isomers), $B_{20}H_{18}^{3-}$ (two isomers), $B_{20}H_{18}^{4-}$ (three isomers), and $B_{24}H_{23}^{3-}$ are also available. For a more complete discussion of boron hydride and derivatives see J. C. Bailar, H. J. Emeleus, R. Nyholm, A. F. Trotman-Dickenson *Comprehensive Inorganic Chemistry*, 1, Pergamon Press, Oxford, England (1973), N. N. Greenwood, 733. Due to the complexity of these compounds, the boron hydride material used to synthesize the catalyst shall be referred to hereinafter as the polyborane material or the anion where the active catalyst or its precursor are referred to as is appropriate.

The metals reported herein include cobalt and nickel although the other metals in Group VIII viz., Fe, Ru, Os, Rh, Ir, Pd and Pt should also work. Salts of these transition metals are employed in the catalyst synthesis. while halides were found to be quite suitable, other inorganic as well as organic species could be employed. Unlike the halides, however, many of these may be partially or totally reduced by the polyborane material at the temperatures of catalyst preparation, without production of catalyst. To compensate, greater amounts of the polyborane material would be required. Thus, salts may also comprise anions from Groups IVB-VIB such as the carbonates, nitrates, sulfates, phosphates and the like, organic salts from carboxylic acids, alkoxides and the like and organometallic derivatives such as $Co(CO)_4I$.

The basic criterion is that a salt of the Group VIII metal be employed and therefore, the particular anion thereof selected is not critical to practice of the present invention. As already stated, the salts to be avoided would include any which will only be reduced by the polyborane anion, as would be readily known to those persons skilled in the art. Thus, the foregoing recitation of anions has been presented as enabling but should not be construed as an exhaustive listing.

Preparation of the catalyst is accomplished by combining the polyborane anion with the transition metal salt in an ether solvent such as tetrahydrofuran. The solvent is then suitably removed such as by distillation or evaporation and the catalyst precursor is then heated with hydrogen to from the heterogeneous boride catalyst of the present invention. The heterogeneous nature of these catalysts is both novel and important to practice of the present invention. Being heterogeneous, these catalysts do not promote hydrogenation of alkynes at room temperature and furthermore do not extensively promote saturation of aromatic compounds.

With respect to the step of heating in the presence of hydrogen, the catalyst is prepared at a temperature of from about 200° C. to about 600° C. with 400° C. being preferred at pressures ranging from at least about 3.45 MPa to about 34.5 MPa or higher with 13.8 MPa being preferred. For a laboratory scale production, reaction time during heating under pressure ranges from about 0.3 hour to about 5 hours with 1 hour being preferred. It will readily be appreciated by those skilled in the art that commercial scale volumes may necessitate longer reaction times.

The polyborane anion employed to prepare the catalyst of the present invention can be prepared by reacting the desired polyborane material, e.g., $B_5H_9$, with a metal hydride of a Group IA or IIA element or with a tetraalkyl ammonium salt, the alkyl comprising $C_1$ to $C_4$ groups. The two components are combined in stoichiometric amounts in the presence of a solvent in which the components, e.g., hydride and polyborane material, are stable. Thus, an ether solvent such as tetrahydrofuran would be suitable while an alcohol would not. The hydride deprotonates or adds a hydrogen to the polyborane material forming the polyborane anion which is thereafter reacted with the appropriate metal salt as set forth hereinabove. The polyborane anion solution is filtered to remove any excess hydride that may have been added to insure total reactivity with the polyborane material. The transition metal salt is then added to the filtered solution, as discussed hereinabove, to form the catalyst precursor.

If desired, the catalyst can be prepared in situ just prior to the reaction in which it is employed to treat the carbonaceous material. In this instance, the ether solvent is removed and the catalyst precursor is contacted with the carbonaceous material under hydrogen gas and pressure. The process for treatment shall be discussed in detail hereinbelow, however, it can be stated here that under hydrogen pressure and suitable temperatures, the catalyst precursor will be converted to the heterogeneous boride catalyst which, in turn, will convert the carbonaceous material.

A typical synthesis for a cobalt polyborane catalyst of the present invention according to the process of the invention was as follows:

Cobalt-Polyborane catalyst 40 mmoles of $NaB_5H_8$ were prepared in tetrahydrofuran solvent from 40 mmoles of $B_5H_9$ and 40 mmoles of NaH. The resulting solution was filtered and then added to 4.3 g (20 mmoles) of anhydrous cobaltous bromide and the dark suspension formed was poured under nitrogen into a high pressure vessel. Tetrahydrofuran was removed in a nitrogen gas stream followed by pressurization with hydrogen and heating to 400° C. for one hour. 5.3 g of black powder were recovered which analyzed as follows: Co 14.8%; B 17%; C 4.1%; Br 32.5%; H 1.6%; Na 8.7% and some oxygen for which analysis was not specifically conducted.

Nickel-Polyborane Catalyst

An analogous procedure was followed to prepare a nickel boride catalyst as was employed for the cobalt boride catalyst. Analysis revealed the following composition: Ni 15%; B 12.4%; C 1.2%; H 1.7%; Br 36.4%; Na 8.0% and some oxygen.

The process preferably requires that the ratio of polyborane anion to metal salt employed range between about 1.5 to 5:1. Using a divalent metal, two equivalents of polyborane anion are combined with one equivalent of metal salt (halide). Sodium polyborane was prepared in situ to which was added the metal salt to form a suspension. The suspension was treated under hydrogen, temperature and pressure to form the heterogeneous boride catalyst, the exact structure of which is not known.

The catalysts are granular solids appearing to consist of loosely clumped aggregates of irregular sizes. With mild crushing the aggregates broke into pieces of 4–80μ with irregular surfaces. The surface area of the catalysts are typically 13–15 $m^2/g$. The catalysts are not pyrophoric and are stable toward hydrolysis, and dissolve slowly in hot nitric acid or aqua regia. Metal and boron levels for the catalysts prepared were in the region of 15 and 12–17 weight percent, respectively, based upon the active i.e., unsupported, weight of catalyst and vibrational spectroscopy indicated the presence of some terminal BH linkages (2505 $cm^{-1}$ by IR) as well as some bidentate structures of the type (1400 $cm^{-1}$ region by IR) in these compounds. Boron levels in the range of 12 to 17 weight percent are high for catalysts and are also believed to be novel.

The catalysts may be used unsupported in tablet or pellet form or they may be coated upon inert supports, such as silica, alumina, alumina-silica, silicon carbide, titania, zirconia, zeolites and clays such as kieselguhr. Techniques of coating are included in U.S. Pat. No. 4,077,912. The inert supports preferably are of at least about 20 microns in diameter.

As stated hereinabove, the catalysts can be used to treat carbonaceous materials such as coal, crude oil, shale oil and other complex hydrocarbons containing heteroatom molecules. To demonstrate the process for use of the catalysts of the present invention, the cobalt and nickel catalysts discussed hereinabove were used to process coal and also thiophene and furan, "model" organocyclic containing heteroatoms including sulfur and oxygen compounds representative of those found in shale oil and crude oil.

Hydrotreatment of coal is a process whereby oil and other products can be obtained. It is generally believed that coal is predominately a crosslinked high polymer with condensed aromatic aggregates that are difficult to cleave but with interconnecting links that may be relatively easy to cleave provided the appropriate chemical conditions are established and maintained during the coal reaction. As far as is presently known, the links or bonds in the coal that might be broken and assist in its liquefaction under mild conditions are the following: $Ar—(CH_2)_n—AR$, n=1–4, $Ar—O—Ar$, $Ar—O—R$, $R—O—R$ (Ar=aryl, R=alkyl); and thioether analogues. Use of the process of the present invention and the novel catalysts to hydrotreat coal provides some oil of a raw, synthetic, crude nature which remains relatively unsaturated. Additionally, asphaltene, preasphaltene and char result.

Generally, crude oil and shale oil comprise a plurality of fused rings, at least one of which will contain a heteroatom. The process of the present invention and novel catalysts will cleave heteroatoms from the ring providing hydrogen-heteroatom compounds including $H_2S$ and various saturated mercapto compounds which can be separated by conventional means. An important feature of the present invention is that the heteroatoms are cleaved without excessively breaking or saturating the neighboring, previously fused rings. Thus, costly quantities of hydrogen are not expended and saturated by-products are not primarily obtained which would only require cracking at additional expense.

In Examples 1–4, raw coal samples (High Volatile Bituminous Virginia Coal or HVBC) were ground under nitrogen using a Spex Mixer-Mill (5×7 cm O.D.) inside a glove box for 20 minutes to 1 hour. Samples were not sieved but the data quoted were for identical samples where the average surface area of the coal and average particle size would be the same for the reactions under comparison.

For Examples 5–10, solvent refined coal (SRC) was heated to 146° C. for 2 hours and then 40° C. overnight under vacuum to remove any trace of water. The coal was then ground under nitrogen for 50 to 75 minutes and sieved through an 80 Tyler mesh screen.

Analysis of High Volatile Bituminous Virginia Coal gave the following results: C 84.5%; H 5.7%; N 1.9%; O 6.3%; S 1.5%. Analysis of SRC gave: C 86.28%; H 6.02%; N 1.96%; O 4.0%; S 0.89%.

In the work which follows, HVBC and SRC were treated over the catalysts of the present invention and converted to oil, asphaltene and preasphaltene and char. Weight percents of each product were determined as was the ratio of asphaltene to char. The overall percentage yields were calculated using the following equations in which:

(a) = wt. of preasphaltene plus char (b) = wt. of asphaltene (c) = wt. of oil (d) = initial wt. of coal sample $$\% \text{ preasphaltene plus char} = \frac{a}{d} \times 100$$

$$\% \text{ oil plus asphaltene} = \frac{d-a}{d} \times 100$$

$$\% \text{ oil} = \frac{c}{c+b} (d-a) \times 100$$

$$\% \text{ asphaltene} = \frac{b}{c+b} (d-a) \times 100$$

The ratio of oil to asphaltene is c:b and the ratio $(d-a):(c+b)=1$ for 100 percent recovery of products.

The hydrotreating reactions according to the process of the present invention for both solid and liquid carbonaceous materials were conducted in an organic solvent such as toluene, cyclohexane tetrahydronaphthalene, recycled oil and the like. The catalyst was contacted in the presence of the solvent by the carbonaceous material at a temperature ranging from about 200° C. to 600° C. under hydrogen at 3.45 MPa to 34.5 MPa pressure for a time of from about 0.3 to 24 hours. Preferred conditions are about 400° C. and 22.8 MPa for treatment of solids, e.g., coal and 400° C., 13.8 MPa for treatment of liquids, e.g., shale oil. For the laboratory scale work reported herein, a one hour reaction time is suitable, however, for larger commercial scale treatments it is likely that the time can vary, partially due to the larger volumes being treated and partially due to the extent the operator may wish the process to proceed. Specific times are therefore not critical and can be determined readily by those skilled in the art. The amount of feed material to catalyst employed can be as high as about 150:1 with 30:1 being preferred. Solvent amount was typically 20 to 40 percent by weight of the amount of raw feed. Greater or lesser amounts could also be employed depending upon the reactor configuration.

In Table I, HVBC was treated in the presence of cyclohexane and no catalyst, Example 1; and in the presence of toluene with the nickel catalyst of the present invention, Example 2, a conventional Co-Mo oxide hydrotreating catalyst, Example 3 and no catalyst, Example 4. Example 3 was reacted for comparison purposes while Examples 1 and 4 served as controls.

TABLE I

| Reactions of High Volatile Bituminous Virginia Coal[a] | | | | | | |
|---|---|---|---|---|---|---|
| Example No. | Catalyst | Solvent | % oils | % asphaltene | preasphaltene and char | oils:asphaltene |
| 1 | None | $C_6H_{12}$ | 12.2 | 42.0 | 45.7 | 1:3.5 |
| 2 | Ni/$B_5H_8$ | Toluene | 24.4 | 25.6 | 50.0 | 1:1.04 |
| 3[b] | Co—Mo | Toluene | 21.5 | 27.5 | 50.9 | 1:1.3 |
| 4 | None | Toluene | 15.9 | 35.2 | 48.9 | 1:2.2 |

[a]Analysis (Moisture and ash free)
% C 84.5
H 5.7
N 1.7
O 6.3
S 1.5
[b]Comparative Example with known catalyst As seen from Table I, Example 1 was an uncatalyzed or control reaction conducted in cyclohexane. Examples 2-4 were performed in a toluene solvent. The uncatalyzed control reaction Example 4 produced the largest amount of asphaltenes (35.2%) and the least amount of oils (15.9%). Example 2 employing a catalyst of the present invention, produced the largest amount of oils (24.4%) and the least amount of asphaltene (25.6%). While Example 3 produced only 21.5% oils and 27.5% asphaltenes, the amount of preasphaltene and char was about the same as for the Ni catalyst of the present invention (50.9%, No. 3 and 50%, No. 2).

Solvent refined coal (SRC) was next treated and is reported in Table II. Six reactions have been presented as Examples 5-10. Each Example was added as a slurry in toluene.

TABLE II

| Reactions of SRC[a] | | | | | | |
|---|---|---|---|---|---|---|
| Example No. | Catalyst | Solvent | % oils | % asphaltenes | % preasphaltene and char | oils:asphaltene |
| 5[b] | Co—Mo[c] | Toluene | 12.1 | 75.5 | 12.4 | 1:6.3 |
| 6 | None | Toluene | 11.3 | 63.9 | 24.8 | 1:5.6 |
| 7 | Ni/$B_5H_8$ | Toluene | 16.2 | 70.6 | 13.1 | 1:4.3 |
| 8 | None | Toluene | 27.0 | 42.0 | 31.0 | 1:5.8 |
| 9 | Co—Mo[c] | Toluene | 34.4 | 58.6 | 7.0 | 1:1.7 |
| 10 | Co/$B_5H_8$ | Toluene | 18.5 | 70.0 | 11.5 | 1:3.6 |

[a]Analysis
% C 86.28
H 6.02
N 1.96
O 4.0
S 0.89
[b]The amount of Co—Mo catalyst used in this reaction was only ¼ mole metal of the other catalysts used
[c]Comparative Example with known catalyst The data in Table II show that less preasphaltene and char (7%) and more oils (34.4%) are produced with the conventional Co-Mo catalyst, while the Co catalyst of the invention produced 18.5% oils and 11.5% preasphaltene and char. Among Examples 8-10, the reaction with no catalyst Example 8 produced 31% preasphaltene and char while producing 27% oils. Although the known Co-Mo catalyst produced more oils than the Ni and Co boride catalysts of the present invention, the results were still satisfactory inasmuch as the catalyzed reactions produced less preasphaltene and char than the uncatalyzed reactions. Furthermore, with a properly configured reactor, those skilled in the art will recognize that oil production should be significantly enhanced.

The data from Examples 5-7 indicate that the Ni catalyst is the most active catalyst in producing oils (16.2%) than other reactions in this group. The known Co-Mo catalyst produced less preasphaltene and char (12.4%) but also less oils (12.1%) than the Ni catalyst. The uncatalyzed control reaction (Example 6) produced more preasphaltene and char (24.8%) and less oils (11.3%) than might have been expected. Although the amount of preasphaltene and char are about the same for both catalyzed reactions, the Ni catalyst of the invention appears to be more active toward liquefaction of SRC.

Lastly, a clay-gel test was employed, the results of which are presented in Tables III and IV for the samples reported in Tables I and II respectively.

The clay-gel test was used to separate the oils into saturates, aromatics and polar fractions. The results in Table III indicated that a higher yield of saturates was observed when toluene (1.1%) was employed as a solvent as opposed to cyclohexane (0.3%). These data also indicated that a slight increase in the percentage of saturates was obtained in a catalyzed reaction.

The trend toward higher conversion to saturates for a catalyzed reaction can also be seen in Table IV (SRC reactions). Most data in Table IV were consistent with what was expected except for Example 10.

The catalysts employed were again typically prepared with nickel or cobalt halide and polyborane anion as discussed hereinabove by reacting two equivalents of polyborane anion to one equivalent of metal salt.

Reactions reported hereinbelow were carried out in an Aminco 4⅝ O.D. vessel (316 S/S) of 845 cm$^3$ capacity. After introduction of catalyst and substrate the vessel was flushed with hydrogen, introduced into a preheated jacket on a rocker-shaker assembly, and pressurized with hydrogen. Pressures given in the tables were those recorded immediately after introduction and pressurization. Valves on the inlet and outlet jump tubes were closed during reactions to prevent contamination from one reaction to the next, and to increase recovery of the products of the reactions. Most reactions were carried out above 400° C. Heating to 400° C. took five hours and the reaction was continued for a further 90 minutes after this temperature was reached. Final temperatures are recorded in the tables and varied slightly depending on the condition of the heating jacket lead wires.

The reaction was quenched through removal of the

TABLE III

Reactions of High Volatile Bituminous Virginia Coal

| Example No. | % Saturates | % Aromatic | % Polars | % Weight[a] Recovery | Final (°C.) Temperature | Initial Pressure (MPa) | Final Pressure (MPa) |
|---|---|---|---|---|---|---|---|
| 1 | 0.3 | 4.6 | 7.3 | 87.0 & 91.3 | 380 | 15.5 | — |
| 2 | 2.2 | 12.7 | 9.5 | 95.4 | 395 | 11.7 | 23.5 |
| 3 | 1.3 | 8.9 | 11.3 | 92.2 | 403 | 11.7 | 22.8 |
| 4 | 1.1 | 6.2 | 8.6 | 97.2 | 400 | 11.7 | 22.1 |

[a]Determined from $\frac{\text{(wt. of preasphaltene + char) + (wt. of toluene extracts)}}{\text{(wt. of substrate)}} \times 100$

TABLE IV

Reactions of SRC

| Example No. | % Saturates | % Aromatics | % Polars | % Weight[a] Recovery | Final (°C.) Temperature | Initial Pressure (MPa) | Final Pressure (MPa) |
|---|---|---|---|---|---|---|---|
| 5 | 1.8 | 3.8 | 6.5 | 98.0 | 395 | 12.3 | 23.5 |
| 6 | 1.0 | 5.5 | 4.8 | 91.0 | 402 | 11.7 | 25.5 |
| 7 | 1.2 | 6.9 | 8.1 | 98.0 | 393 | 12.4 | 22.1 |
| 8 | 1.1 | 10.4 | 15.5 | 91.6 | 398 | 12.8 | 25.5 |
| 9 | 1.4 | 16.0 | 17.0 | 91.6 | 403 | 12.6 | 22.6 |
| 10 | 0.4 | 5.7 | 12.4 | 93.0 | 397 | 12.4 | 22.8 |

[a]See note b in Table III

Having established that the nickel and cobalt boride catalysts of the present invention could convert coal to oil in satisfactory yield, the catalysts were next employed in hydrodesulfurization (HDS) reactions with thiophene and analogous furan hydrogenolysis. Thiophene and furan are model compounds for demonstrating the ability of the catalysts to cleave sulfur and oxygen, respectively, such that the catalyst and process could be utilized to remove heteroatoms from shale oil and crude oil. In the work reported hereinbelow, the following model compounds were used as obtained: thiophene (Columbia Organics); furan (Matheson, Coleman and Bell). Three comparative catalysts, Raney nickel, cobalt boride ($Co_2B$-$Co_3B$) and nickel boride (NiB) were obtained from Alfa-Ventron and a fourth, cobalt oxide-molybdenum oxide (3.5% CoO-10% $MoO_3$ on alumina, 244m$^2$/g) was obtained from Strem Chemicals. Nickel (II) bromide, cobalt (II) chloride and iron (II) bromide were purchased from Alfa-Ventrol. $NaBH_4$, $NMe_4B_3H_8$ were used as obtained from Callery Chemicals.

pressure vessel from the assembly and placement into a large tray of crushed ice. Cooling to 300° C. took two minutes, to 200° required four minutes and 100° C. was reached after six minutes. Gases were vented into a 42 liter tank and were sampled directly (IR, GC, mass spectrometry) before removal of condensables (butane, other light hydrocarbons and $H_2S$). Less volatile products (unreacted thiophene, tetrahydrothiophene, water) were removed by conventional vacuum distillation. Involatile materials were poured from the vessel or extracted using tetrahydrofuran. Mass balances for all reactions were 90–97%. The reaction vessel was washed with nitric acid and buffed internally between reactions to prevent catalyst "ghosting" effects.

The results of twelve reactions with thiophene, Examples 11–22, are summarized in Table V which compares the reactivities of the new boride catalysts with the known catalysts, Raney nickel, commercially available borides, and cobalt oxide-molybdenum oxide on alumina, for the hydrodesulfurization of thiophene. The data in Table V clearly indicate that the nickel and cobalt boride catalysts derived from the pentaborane anion are the most active borides for hydrodesulfurization yet established (Examples 14 and 17). Both systems are at least three times as active as previously known borides, NiB and $Co_2B$-$Co_3B$ (Examples 21 and 22) under the same reaction conditions. Raney nickel also has about one third the activity of the pentaborane-derived catalysts. Significantly, the other boron hydride derived catalyst of the present invention (Example 16) with high activity was derived from another polyborane, $NaB_{10}H_{13}$. With this catalyst, 88% of the thiophene was converted to butane and $H_2S$. Example 15, duplicates No. 14 but was conducted at a lower temperature, 254° C., for an extended period (16 hours). It is readily seen that although operable at lower temperatures, the higher temperature range provides more efficient rates of reaction.

Chromatographic analysis of product gases showed that with the more active catalysts no butene was produced (Examples 14, 15, 16, 17 and 20). In other cases when much of the thiophene remained unreacted, a butane:butene ratio of from 2:1 to 1:1 was observed (note e, Table V), together with variable amounts of tetrahydrothiophene. The coproduction of tetrahydrothiophene and butene in these reactions suggests that the boride catalysts desulfurize by two mechanisms, one direct extrusion of $H_2S$ to produce butene, the other hydrogenation of thiophene followed by sulfur extrusion to produce butane.

It was also observed that catalysts prepared from the polyborane anions (Examples 13-18) promoted some cracking of the $C_4$ framework to propane/methane and ethane which were detected as 15-25% and 5-15% of the hydrocarbon fraction respectively; but with reactions involving the Co-Mo catalyst, the simple binary borides and the reaction with no catalyst, the same fraction was 90-95% $C_4$ hydrocarbons. Trace amounts (~2%) of n-octane were identified by $^{13}C$ NMR in the residues from Examples 14, 16 and 17.

Table VI summarizes data from reaction of the nickel/$NaB_5H_8$ catalyst with furan. There was efficient hydrogenolysis, with 93% of the C—O bonds cleaved. Analysis of the hydrocarbon fraction also indicated some cracking of the $C_4$ framework as observed in the analogous reaction with thiophene.

TABLE V

Reactions of Thiophene[a]

| Example No. | Catalyst Precursors[b] | Hydrogen Pressure (MPa)[c] | Final Temperature (°C.) | % cleavage[d] (hydrodesulfurization to $C_4H_x$[e] and $H_2S$) | % hydrogenation (to tetrahydrothiophene) |
|---|---|---|---|---|---|
| 11 | No catalyst | 14.5 | 440 | 6 | 7 |
| 12 | $NiBr_2$/$NaBH_4$[g] | 14.8 | 440 | 11 | 5 |
| 13 | $NiBr_2$/$NMe_4B_3H_8$ | 11.7 | 445 | 17 | 5 |
| 14 | $NiBr_2$/$NaB_5H_8$ | 12.4 | 445 | 95 | 2[f] |
| 15 | $NiBr_2$/$NaB_5H_8$ | 12.7 | 254 | 33 | 22 |
| 16 | $NiBr_2$/$NaB_{10}H_{13}$ | 15.1 | 425 | 88 | 7[f] |
| 17 | $CoCl_2$/$NaB_5H_8$ | 12.7 | 430 | 99 | 1[f] |
| 18 | $FeBr_2$/$NaB_5H_8$ | 13.1 | 430 | 18 | 8 |
| 19 | Raney nickel[g] | 14.8 | 440 | 32 | 7 |
| 20 | CoMo/alumina[g] | 14.1 | 410 | 100 | — |
| 21 | Nickel Boride,[g] NiB | 14.8 | 420 | 35 | 12 |
| 22 | Cobalt Boride,[g] $Co_2B$—$Co_3B$ | 15.1 | 410 | 36 | 19 |

[a]All reactions were quenched on ice after 90 minutes reaction above 400° C., except Example 15, which was held at 254° C. for 16 hours
[b]All catalyst metal:substrate mole ratios were 1:100
[c]Pressures loaded near ambient temperatures
[d]Established through recovery of thiophene and volatile products
[e]No butene was detected from Examples 14, 17 and 20. Traces were found in Example 16. Butane and butene were produced in the ratio 2:1 from Examples 21 and 22 and in the ratio of 1:1 in the other cases
[f]n-octane was produced at 2% levels with the pentborane-derived catalysts and 5% with the decaborane catalyst
[g]Comparative examples with known catalysts

TABLE VI

Hydrogenolysis[a] of Furan Using $NiBr_2$/$NaB_5H_8$ Boride

| Example No. | Hydrogen Pressure (MPa) | Final Temperature (°C.) | Result |
|---|---|---|---|
| 23 | 12.4 | 440 | 93% cleavage of furan to butane (49%) butene (17%) propane/methane (17%) ethane (8%) n-octane (2%), and $H_2S$ |

[a]Carried out for 90 minutes above 400°C., see Table V, notes a-c for experimental details As can be seen from Tables V and VI, the heterogeneous nickel and cobalt boride compounds prepared from pentaborane anion at elevated temperatures and under hydrogen pressure, exhibited remarkably high reactivities for efficient hydrodesulfurization and for related C—O hydrogenolysis. The iron pentaborane catalyst (Example 18) was less active than other catalysts of the present invention but was still significantly more active than Example 11, the control. These catalysts also have high sulfidation resistances. The new borides prepared from other borane anions were not as reactive, although the next most active was derived from another polyborane, $NaB_{10}H_{13}$.

The results presented herein for the novel boride catalysts derived from polyborane anions parallel reactions well-established for Raney nickel and noble metals, although the catalysts of this invention are more active than Raney nickel. Under the reaction conditions employed, these novel boride catalysts do not promote aromatic hydrogenation in systems such as toluene and ethyl benzene with higher aromatic stabilization energies in the range of 150 kJ/mole. Therefore, the process of the present invention can accomplish removal of heteroatoms from carbonaceous materials with lower amounts of hydrogen than conventional hydrotreating processes and catalysts. Thiophene and furan are, however, readily attacked by these new catalysts, having aromatic stabilization energies of 120 and 66 kJ/mole, respectively.

It should therefore appear clear that these catalysts have considerable potential for the removal of heteroatoms, particularly as hydrodesulfurization catalysts, as well as coal liquefaction catalysts, with indications of different reactivities and selectivities from the known $ZnCl_2$ catalyst which does not promote the removal of sulfur from benzylsulfide, or thiophene and related compounds. Although the $CoO$-$MoO_3$ catalyst efficiently cleaved 100 percent of the sulfur, it is to be noted that unlike the catalysts of the present invention, this catalyst will promote significant saturation of the aromatic compounds.

Based upon the relatively high cleavages of S and O from the model heteroatom compounds thiophene and furan, respectively and the amounts of oil reported Tables I through IV obtained from the liquefaction of coal, it should be apparent that the objects of the invention have been met. It is to be understood that the catalysts disclosed herein as well as the process for their preparation can be varied by employing Group VIII metals as well as polyboranes other than the penta- and deca-species chosen to exemplify the foregoing work. It should also be apparent to those skilled in the art that the present process for treating carbonaceous materials is operable with catalysts of the type disclosed herein to react with both solid and liquid carbonaceous materials. The catalysts of the present invention and process for the use thereof can remove heteroatoms, with some hydrocarbon cracking, from shale oil and crude oil, and they can also be employed to liquefy coal, but they do not promote complete hydrogenation of the material treated.

In conclusion, it is to be understood that all process and catalyst component variables disclosed fall within the scope of the claimed invention and that the subject invention is not to be limited by the examples set forth herein. These have been provided merely to demonstrate operability and, therefore, the selection of specific components and reaction conditions can be determined without departing from the spirit of the invention herein disclosed and described. Moreover, the scope of the invention shall include all modifications and variations that may fall within the scope of the attached claims.

I claim:

1. A process for treating solid and liquid carbonaceous materials comprising the steps of:
   contacting a carbonaceous material with a heterogeneous Group VIII metal boride containing catalyst and with hydrogen in the presence of a solvent in a reactor;
   pressurizing said reactor with hydrogen to at least about 3.45 MPa; and
   heating said reactor to a temperature of from about 200° C. to about 600° C.;
   wherein said solid carbonaceous materials become partially liquified and heteroatoms are removed from said liquid carbonaceous materials.

2. A process, as set forth in claim 1, wherein said heterogeneous boride catalyst comprises:
   a polyborane anion; and
   a Group VIII metal.

3. A process, as set forth in claim 2, wherein said polyborane anion is derived from a polyborane having from two to about 20 boron atoms.

4. A process, as set forth in claim 3, wherein said polyborane anion is selected from the group consisting of $B_5H_8^-$ and $B_{10}H_{13}^-$.

5. A process, as set forth in claim 4, wherein said metals are selected from the group consisting of cobalt and nickel.

6. A process, as set forth in claim 5, wherein said metal is cobalt and said polyborane anion is $B_5H_8^-$.

7. A process, as set forth in claim 6, wherein said metal is nickel and said polyborane anion is $B_5H_8^-$.

8. A process, as set forth in claim 7, wherein the boron content of said catalyst is at least 12 weight percent based upon the weight of active catalyst.

9. A process, as set forth in claim 8, wherein said carbonaceous material is a solid and said step of pressurizing is conducted at about 22.8 MPa and said step of heating is conducted at about 400° C.

10. A process, as set forth in claim 9, wherein said solid carbonaceous material is selected from the group consisting of coal and solvent refined coal.

11. A process, as set forth in claim 1, wherein said carbonaceous material is a liquid and said step of pressurizing is conducted at about 13.8 MPa and said step of heating is conducted at about 400° C.

12. A process, as set forth in claim 11, wherein said liquid carbonaceous material is selected from the group consisting of shale oil and crude oil.

13. A process for treating solid and liquid carbonaceous materials comprising the steps of:
   contacting a polyborane anion with a salt of a Group VIII metal in the presence of a first solvent to form a catalyst precursor;
   removing said solvent;
   contacting a carbonaceous material with said catalyst precursor and with hydrogen in the presence of a second solvent in a reactor;
   pressurizing said reactor with hydrogen to at least about 3.45 MPa; and
   heating said reactor to a temperature of from about 200° C. to about 600° C. for a period of time sufficient to form a heterogeneous boride catalyst and to treat said carbonaceous material therewith;
   wherein said solid carbonaceous materials become partially liquified and heteroatoms are removed from said liquid carbonaceous materials.

14. A process, as set forth in claim 13, wherein said polyborane ion is prepared by the step of:
   contacting a polyborane material with a compound selected from the group consisting of Group IA and IIA metal hydrides in the presence of said first solvent.

15. A process, as set forth in claim 14, wherein said polyborane material has from two to about 20 boron atoms.

16. A process, as set forth in claim 15, wherein said polyborane material is selected from the group consisting of $B_5H_9$ and $B_{10}H_{14}$.

17. A process, as set forth in claim 16, wherein said metal hydride is sodium hydride.

18. A process, as set forth in claim 17, wherein said first solvent is an ether.

19. A process, as set forth in claim 13, wherein said polyborane anion is selected from the group consisting of $B_5H_8^-$ and $B_{10}H_{13}^-$.

20. A process, as set forth in claim 19, wherein said metals are selected from the group consisting of cobalt and nickel.

21. A process, as set forth in claim 20, wherein said metal is cobalt and said polyborane anion is $B_5H_8^-$.

22. A process, as set forth in claim 21, wherein said metal is nickel and said polyborane anion is $B_5H_8^-$.

23. A process, as set forth in claim 13, wherein the boron content of said catalyst is at least 12 weight percent based upon the weight of active catalyst.

24. A process, as set forth in claim 23, wherein said carbonaceous material is a solid and said step of pressurizing is conducted at about 22.8 MPa and said step of heating is conducted at about 400° C.

25. A process, as set forth in claim 24, wherein said solid carbonaceous material is selected from the group consisting of coal and solvent refined coal.

26. A process, as set forth in claim 25, wherein said carbonaceous material is a liquid and said step of pressurizing is conducted at about 13.8 MPa and said step of heating is conducted at about 400° C.

27. A process, as set forth in claim 26, wherein said liquid carbonaceous material is selected from the group consisting of shale oil and crude oil.

* * * * *